(12) United States Patent
Schwartz et al.

(10) Patent No.: US 12,640,776 B2
(45) Date of Patent: May 26, 2026

(54) WIRELESS POWER SYSTEMS WITH AMPLITUDE-SHIFT-KEYING COMMUNICATIONS

(71) Applicant: Apple Inc., Cupertino, CA (US)

(72) Inventors: Adam L Schwartz, Redwood City, CA (US); Sriram Narayanan, Los Gatos, CA (US); Xing Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 18/160,532

(22) Filed: Jan. 27, 2023

(65) Prior Publication Data

US 2023/0370115 A1      Nov. 16, 2023

Related U.S. Application Data

(60) Provisional application No. 63/342,457, filed on May 16, 2022.

(51) Int. Cl.
H04B 5/79          (2024.01)
H02J 50/10          (2016.01)
(Continued)

(52) U.S. Cl.
CPC ............... H04B 5/79 (2024.01); H02J 50/10 (2016.02); H02J 50/80 (2016.02); H04B 5/266 (2024.01); H04L 27/06 (2013.01)

(58) Field of Classification Search
CPC ...................................................... H04B 5/79
See application file for complete search history.

(56) References Cited

U.S. PATENT DOCUMENTS 9,960,643 B2      5/2018  Gao et al.
2010/0013531 A1*  1/2010  Ainspan ................ H03L 7/1075
                                                                327/159
(Continued)

FOREIGN PATENT DOCUMENTS

KR        20190063705 A      6/2019
WO          2022119102 A1      6/2022

*Primary Examiner* — Wen W Huang
(74) *Attorney, Agent, or Firm* — Treyz Law Group, P.C.; Joseph F. Guihan

(57)                    ABSTRACT

A wireless power system has a wireless power transmitting device and a wireless power receiving device. The wireless power transmitting device may include ASK decoding circuitry. An inverter controller may supply control signals to an inverter based on a clock signal. To improve wireless transmission at various frequencies of interest, the clock signal used by the inverter controller may be dithered using a modulating signal. To mitigate bit errors in ASK decoding caused by the dithering of the clock signal in the wireless power transmitting device, ASK communication receiving circuitry in the wireless power transmitting device may receive information regarding the modulating signal used to dither the clock signal. The ASK communication receiving circuitry may receive a clock signal that has been dithered using the modulating signal, dither an analog-to-digital converter sampling rate using the modulating signal, or include notch filtering circuitry with parameters determined based on the modulating signal.

20 Claims, 9 Drawing Sheets

(51) Int. Cl.
    *H02J 50/80*        (2016.01)
    *H04B 5/26*         (2024.01)
    *H04L 27/06*        (2006.01)

(56)                References Cited

U.S. PATENT DOCUMENTS

| | | | |
|---|---|---|---|
| 2013/0026849 A1* | 1/2013 | Ohta ........................ | G06F 1/26 |
| | | | 307/104 |
| 2015/0049833 A1* | 2/2015 | Noguchi ................ | H04B 5/266 |
| | | | 375/272 |
| 2016/0336785 A1* | 11/2016 | Gao ....................... | H04B 5/266 |
| 2016/0336976 A1* | 11/2016 | Onishi ................. | H04B 1/0475 |
| 2017/0149291 A1* | 5/2017 | Iwasaki ................... | H02J 50/80 |
| 2017/0271927 A1 | 9/2017 | Sakata et al. | |
| 2019/0393734 A1* | 12/2019 | Zhou ....................... | H02J 50/12 |
| 2020/0003819 A1 | 1/2020 | Ruiz-Garcia et al. | |
| 2020/0076297 A1 | 3/2020 | Nag et al. | |
| 2020/0381959 A1 | 12/2020 | Goodchild et al. | |
| 2021/0384747 A1 | 12/2021 | Kim et al. | |
| 2021/0409073 A1 | 12/2021 | Louis et al. | |
| 2022/0360118 A1* | 11/2022 | Goodchild ............ | H02J 50/402 |
| 2024/0291320 A1* | 8/2024 | Schuler ................ | H02J 7/0071 |

* cited by examiner $$s(t) \approx A(t)cos(2\pi F_c t + \Delta t)$$

FIG. 5A

$$r(t) = LPF\{s(t)cos(2\pi F_c t + \Delta t)\}$$

FIG. 5B

$$r(t) = A(t)LPF\left\{\frac{1}{2}\left(1 + cos(4\pi F_c t + 2\Delta t)\right)\right\}$$

FIG. 5C

$$r(t) = \frac{1}{2}A(t)$$

FIG. 5D

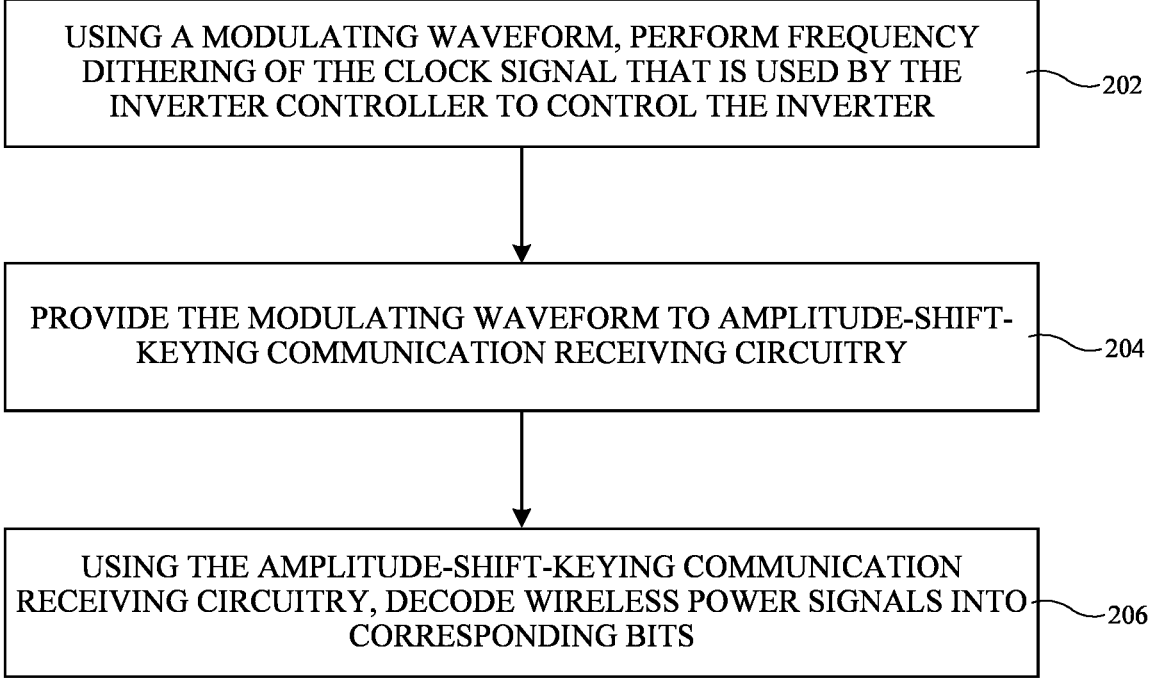

USING A MODULATING WAVEFORM, PERFORM FREQUENCY DITHERING OF THE CLOCK SIGNAL THAT IS USED BY THE INVERTER CONTROLLER TO CONTROL THE INVERTER — 202

PROVIDE THE MODULATING WAVEFORM TO AMPLITUDE-SHIFT-KEYING COMMUNICATION RECEIVING CIRCUITRY — 204

USING THE AMPLITUDE-SHIFT-KEYING COMMUNICATION RECEIVING CIRCUITRY, DECODE WIRELESS POWER SIGNALS INTO CORRESPONDING BITS — 206

FROM SCALING CIRCUITRY $cos(2\pi F_c t + \Delta t)$ r(t)

s(t)

120

110

FROM SCALING CIRCUITRY $cos(2\pi F_c t + \Delta t)$ $sin(2\pi F_c t + \Delta t)$ 120-1 r(t)

120-2 s(t)

r'(t)

WIRELESS POWER SYSTEMS WITH AMPLITUDE-SHIFT-KEYING COMMUNICATIONS

This application claims the benefit of provisional patent application No. 63/342,457, filed May 16, 2022, which is hereby incorporated by reference herein in its entirety.

FIELD

This relates generally to power systems, and, more particularly, to wireless power systems for charging electronic devices.

BACKGROUND

In a wireless charging system, a wireless power transmitting device transmits wireless power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

A wireless power transmitting device may be configured to provide wireless power to a wireless power receiving device. The wireless power transmitting device may include a wireless power transmitting coil, an inverter that is configured to supply alternating-current drive signals to the wireless power transmitting coil, an inverter controller that is configured to, based on a clock signal that is dithered using a modulating signal, supply control signals to the inverter, and amplitude-shift-keying communication receiving circuitry configured to, based at least partially on information regarding the modulating signal, monitor alternating-current signals at the wireless power transmitting coil and decode the monitored alternating-current signals into bits.

BRIEF DESCRIPTION OF THE DRAWINGS

FIGS. 5A-5D are illustrative formulas related to the down-conversion of wireless power signals in a wireless power transmitting device in accordance with an embodiment.

FIG. 9 is a flow chart of illustrative operations involved in using a wireless power system in accordance with an embodiment.

DETAILED DESCRIPTION

Figure 1:
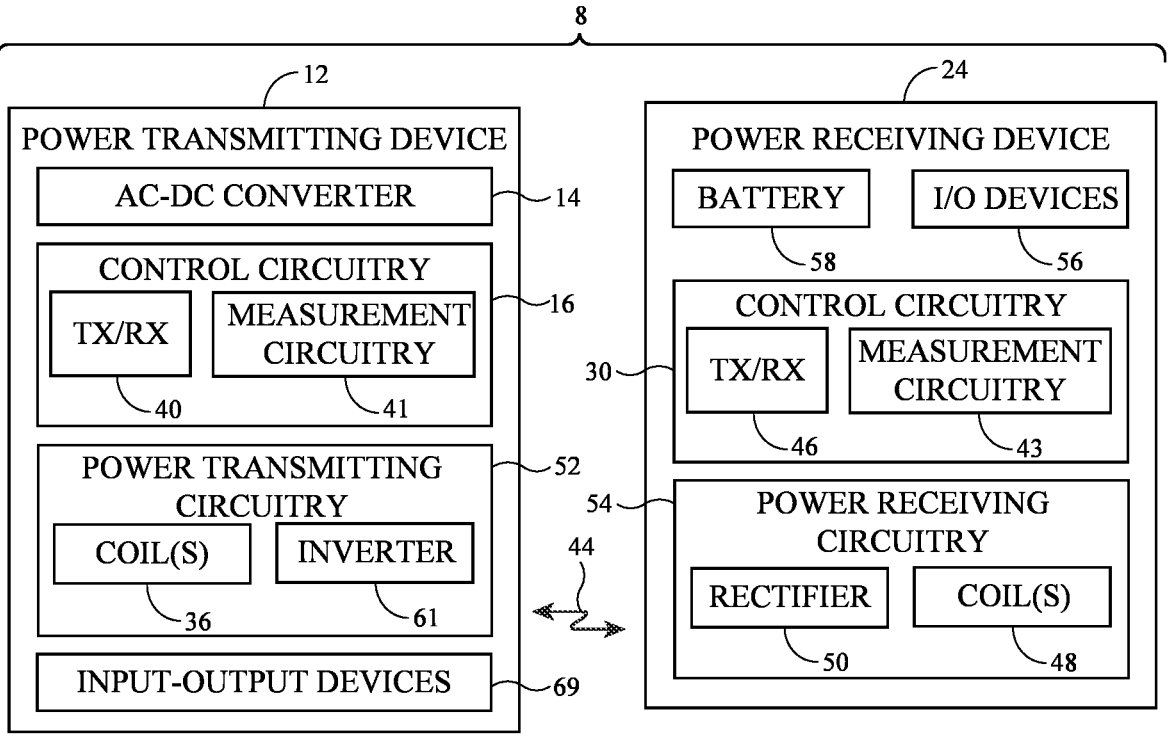
FIG. 1 is a schematic diagram of an illustrative wireless power system in accordance with various embodiments.

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a cellular telephone, tablet computer, laptop computer, removable battery case, electronic device accessory, wearable such as a wrist watch, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

The wireless power receiving device may include amplitude-shift-keying communication circuitry. The amplitude-shift-keying (ASK) communication circuitry may be configured to modulate the impedance of the wireless power receiving circuitry in the wireless power receiving device, which induces a change in amplitude of the wireless power transfer signal that is being transmitted between the wireless power transmitting and receiving devices. The wireless power transmitting device may include ASK decoding circuitry that is configured to decode the signals through the coil into bits.

In some wireless power systems, a clock signal used by an inverter controller to generate control signals for an inverter may be dithered using a modulating signal. The wireless power signal (e.g., a square-wave, a sinusoid, or some other periodic waveform) that results from the inverter will have its frequency shifted by this dithering process. The dithered waveform may provide benefits such as a reduction in peak amplitude at various frequencies of interest (e.g., harmonics). Exemplary techniques for wireless power signal dithering in wireless power transfer systems are described in U.S. application Ser. No. 17/680,463, filed Feb. 25, 2022, which is hereby incorporated by reference in its entirety.

Dithering techniques, however, introduce challenges in ASK communications as the underlying transmission waveform can no longer assumed to be purely periodic. To mitigate bit errors in ASK decoding caused by the dithering of the clock signal in the wireless power transmitting device, ASK communication receiving circuitry in the wireless power transmitting device may receive information regarding the modulating signal used to dither the clock signal. The ASK communication receiving circuitry may receive a clock signal that has been dithered using the modulating signal, the ASK communication receiving circuitry may dither an analog-to-digital converter sampling rate using the modulating signal, or the ASK communication receiving circuitry may include notch filtering circuitry with parameters determined based on the modulating signal.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Power receiving device 24 may be a portable electronic device such as a cellular telephone, a laptop computer, a tablet computer, a wearable such as an earbud or wrist watch, a wirelessly charged removable battery case for an electronic device, or other electronic equipment. Power transmitting device 12 and/or power receiving device 24 may be capable of both transmitting and receiving wireless power. For example, a single coil in an electronic device may be operable in a power receiving mode (where power is received) or a power transmitting mode (where power is transmitted).

Power transmitting device 12 may be coupled to a wall outlet (e.g., an alternating-current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable electronic device such as a cellular telephone, etc.) may have only a single coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output. Device 12 may include input-output devices 69 (e.g., any of the input-output devices described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. As another example, ASK modulation may be used to convey in-band data from power transmitting device 12 to power receiving device 24 and/or FSK modulation may be used to convey in-band data from power receiving device 24 to power transmitting device 12. In general, wireless power may simultaneously be conveyed between devices during in-band communications (using ASK or FSK).

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring on or more currents such as a wireless power transmitting coil current).

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring one or more currents such as wireless power receiving coil current and/or rectifier output current).

Figure 2:
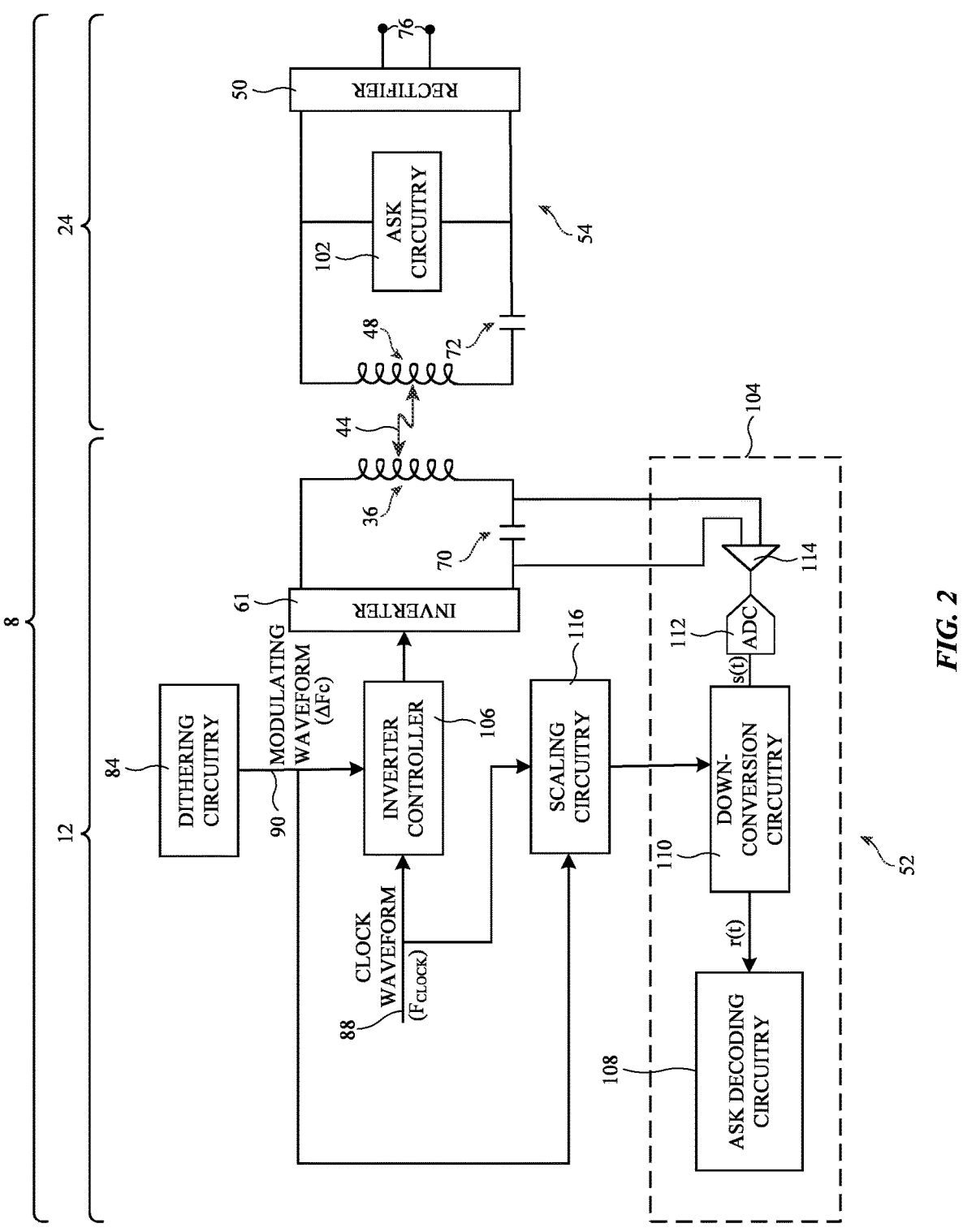
FIG. 2 is a circuit diagram of an illustrative wireless power system with dithering circuitry that provides a modulating signal to scaling circuitry in accordance with an embodiment.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The exemplary configuration of FIG. 2 includes a transmitting coil 36 and a receiving coil 48.

As shown in FIG. 2, wireless power transmitting circuitry 52 includes inverter circuitry 61 and inverter controller 106. Inverter controller 106 may provide control signals to inverter circuitry 61. Inverter circuitry (inverter) 61 may be used to provide signals to coil 36 based on the control signals from inverter controller 106. During wireless power transmission, inverter 61 supplies alternating-current drive signals to coil 36 at a power transmission frequency. Circuit components such as capacitor 70 may be coupled in series with coil 36 as shown in FIG. 2.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitor 72 may be coupled in series with coil 48. Rectifier 50 receives the AC current from coil 48 and produces corresponding direct-current power (e.g., direct-current voltage Vrect) at output terminals 76. This power may be used to power a load.

If desired, some of the devices in wireless power system 8 may have both the ability to transmit wireless power signals and to receive wireless power signals. A cellular telephone or other portable electronic device may, as an example, have a single coil that can be used to receive wireless power signals from a charging puck or other wireless power transmitting device and that can also be used to transmit wireless power to another wireless power device (e.g., another cellular telephone, an accessory device, etc.). A device that can both transmit and receive wireless power may have all of the components of wireless power transmitting device 12 and all the components of wireless power receiving device 24 (e.g., power transmitting circuitry 52 and power receiving circuitry 54 are included in a single device). However, the functionality of the wireless power transmission and the wireless power reception is the same as described in connection with FIGS. 1 and 2. Therefore, although the examples herein will focus on a scenario where a dedicated wireless power transmitting device transfers charge to a dedicated wireless power receiving device, it should be understood that a device that both transmits and receives wireless power may be substituted for one or both devices. In other words, coil 36 may also be capable of receiving wireless power and coil 48 may also be capable of transmitting wireless power.

As shown in FIG. 2, wireless power receiving circuitry 54 includes amplitude-shift-keying (ASK) circuitry 102 (which may be considered part of wireless transceiver circuitry 46). The ASK circuitry may include, as one example, a series connected capacitor and a switch that are parallel to the coil 48. Closing and opening the switch changes the impedance of wireless power receiving circuitry 54, which induces a corresponding perturbation in amplitude at the signal through coil 36 in power transmitting circuitry 52. Modulating the state of the switch in ASK circuitry 102 may therefore be used to transmit ASK modulation states from power receiving device 24 to power transmitting device 12. This example is merely illustrative and there are other possible ways of achieving ASK modulation (e.g., varying the rectifier load). In general, any desired ASK modulation techniques may be used. Wireless power transmitting circuitry 52 may include ASK communication receiving circuitry 104 (which may be considered part of wireless transceiver circuitry 40) that is used to decode the ASK modulation states into corresponding bits. ASK communication receiving circuitry 104 monitors the amplitude and/or phase of the AC signal passing through coil(s) 36 and, using ASK demodulation, extracts the transmitted in-band data from these signals that were transmitted by ASK circuitry 102. The use of ASK communications allows data bits to be transmitted in-band from device 24 to device 12 with coils 48 and 36 while power is simultaneously being wirelessly conveyed from device 12 to device 24 using coils 36 and 48.

Multiple data bits taken together can constitute data packets for communication between devices 12 and 24.

Wireless power transmitting circuitry 52 in power transmitting device 12 may include dithering circuitry such as dithering circuitry 84. As previously mentioned, power transmitting device 12 transmits AC signals to power receiving device 24 at a power transmission frequency. The power transmission frequency may be between 100 kHz-100 MHz or any other desired frequency. A clock signal may be provided to inverter controller 106. Based on the clock signal, inverter controller 106 may provide control signals (sometimes referred to as inverter control signals) to inverter circuitry 61 to cause switches (e.g., transistors) in the inverter circuitry to turn on and off to create AC current signals through the wireless power transmitting coil (at desired power transmission frequencies).

Some wireless power systems employ signal dithering to improve electromagnetic emission characteristics of the system. For example, system 8 may dither the clock signal that is used by inverter controller 106 to control inverter 61 in wireless power transmission circuitry 52. This effectively dithers the frequency of the periodic waveform of the wireless power transfer signal between power transmitting device 12 and power receiving device 24.

Herein, various signals (e.g., clock signals) may be referred to as having corresponding waveforms (e.g., the shape of the voltage of the signal over time). A given waveform may have a recurring shape that repeats at a given frequency (i.e., the given waveform may be periodic). The recurring shape need not necessarily be a regular shape (e.g., a sinusoid). Indeed, the recurring shape may deviate from a sinusoidal shape. However, this type of waveform may still have a frequency associated with the periodic repeating of the non-sinusoidal shape.

Dithering circuitry 84 may output a modulating signal 90 with a corresponding modulating waveform (sometimes referred to simply as modulating waveform 90). Wireless power transmitting device 12 also includes a clock signal 88 ($F_{CLOCK}$) (sometimes referred to as clock waveform 88, power transmission clock waveform 88, native clock waveform 88, initial clock waveform 88, undithered clock waveform 88, system clock 88, etc.). Modulating signal 90 is used to modulate the system clock waveform 88.

Figure 3:
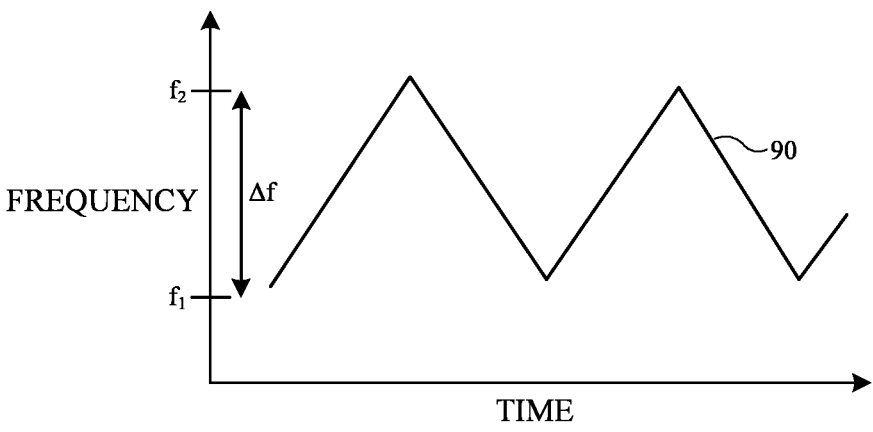
FIG. 3 is a graph of an illustrative modulating signal that may be used to modulate a clock signal in a power transmitting device in accordance with an embodiment.

FIG. 3 is a graph of an illustrative modulating signal that may be used for frequency dithering. The modulating signal is used to frequency modulate (dither) the system clock signal so that the carrier wave (e.g., the output of the inverter) is frequency dithered. The modulating signal may have a corresponding modulation frequency $f_m$ and a frequency spread $\Delta f$. Modulation frequency $f_m$ is the frequency, also called dither pattern repetition rate, of modulating wave 90. In other words, the modulating signal sweeps between two fixed frequencies $f_1$ and $f_2$ at the modulation frequency, or repetition rate of, $f_m$. The difference between frequencies $f_1$ and $f_2$ may sometimes be referred to as the frequency spread or frequency deviation ($\Delta f$) of the modulating signal.

Consider the example where the wireless power system selects a power transmission frequency of 140 kHz. The unmodified clock waveform 88 may be a square wave or sinusoidal wave at 140 kHz. The modulating signal 90 may have a frequency spread ($\Delta f$) of 10 kHz and a modulation frequency ($f_m$) of 15 kHz. In this example, after waveform 88 is frequency modulated with modulating signal 90, the modified clock signal may, at a 15 kHz repetition rate, sweep back and forth between 135 kHz and 145 kHz. In this example, the frequency spread of the modulating signal is distributed evenly about the original frequency 140 kHz.

This may be referred to as a center spread. Alternatively, the frequency modulation may be down spread (such that the modified clock signal sweeps back and forth between 130 kHz and 140 kHz) or up spread (such that the modified clock signal sweeps back and forth between 140 kHz and 150 kHz).

There are many options for the modulating signal modulation frequency $f_m$, frequency deviation $\Delta f$, and waveform shape of modulating signal 90. Modulation frequency $f_m$ may be greater than 0 kHz, greater than 5 kHz, greater than 10 kHz, greater than 20 kHz, greater than 30 kHz, greater than 40 kHz, greater than 50 kHz, greater than 75 kHz, greater than 100 kHz, greater than 200 kHz, less than 5 kHz, less than 10 kHz, less than 20 kHz, less than 30 kHz, less than 40 kHz, less than 50 kHz, less than 75 kHz, less than 100 kHz, less than 200 kHz, etc. Frequency deviation $\Delta f$ may be greater than 0 kHz, greater than 1 kHz, greater than 3 kHz, greater than 5 kHz greater than 10 kHz, greater than 20 kHz, greater than 30 kHz, greater than 40 kHz, greater than 50 kHz, less than 1 kHz, less than 3 kHz, less than 5 kHz less than 10 kHz, less than 20 kHz, less than 30 kHz, less than 40 kHz, less than 50 kHz, etc. In FIG. 3, modulating signal 90 has a triangular shape. This example is merely illustrative. In general, modulating signal 90 may have any desired shape (e.g., sinusoidal shape, square shape, sawtooth shape, a randomized shape, or a step shape that approximates any of the aforementioned shapes).

Figure 4A:
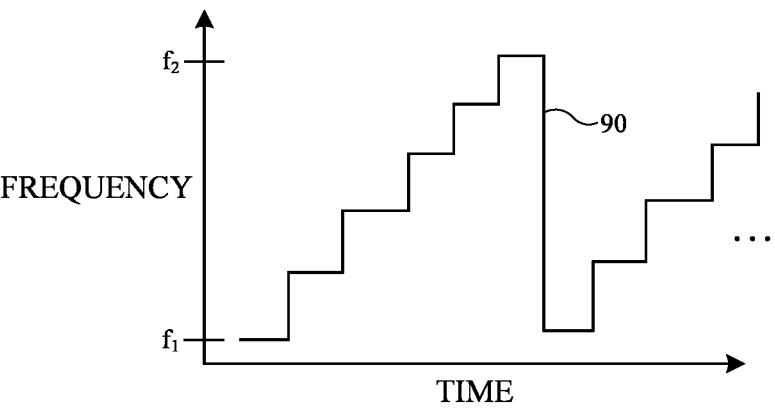
FIG. 4A is a graph of an illustrative modulating signal that has a regular step shape in accordance with an embodiment.
Figure 4B:
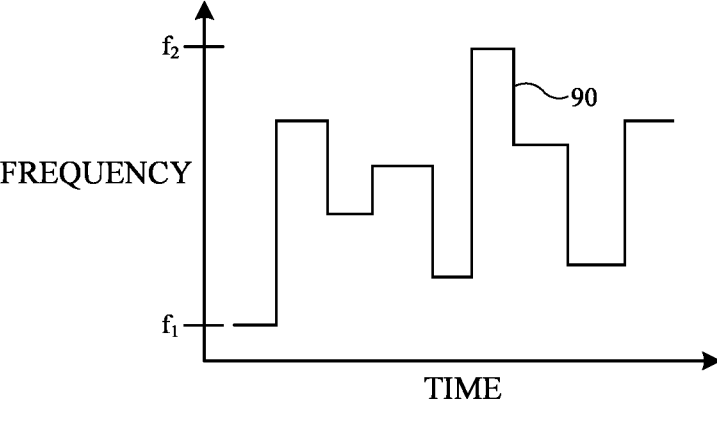
FIG. 4B is a graph of an illustrative modulating signal that has an irregular step shape in accordance with an embodiment.

FIGS. 4A and 4B are graphs of illustrative modulating signals 90 that may be used in clock signal dithering for wireless power transmission. FIG. 4A is an example of a waveform that has a step shape that follows a regular pattern (i.e., a regular step shape). In FIG. 4A, the regular step shape approximates a sawtooth shape. The waveform increases in successive steps between a minimum frequency $f_1$ and a maximum frequency $f_2$. Once $f_2$ is reached, the waveform returns to $f_1$ and repeats the pattern. In FIG. 4A, there are six frequencies used in the waveform (e.g., $f_1$, $f_2$, and four intervening frequencies). The duration the clock signal spends at each frequency (e.g., the width of each step) may be the same or approximately the same. Alternatively, the duration the clock signal spends at each frequency may be varied if desired.

In FIG. 4B, the modulating signal 90 has an irregular step shape. Similar to as in FIG. 4A, the waveform of FIG. 4B may have successive steps between a minimum frequency $f_1$ and a maximum frequency $f_2$. In FIG. 4B, there are six frequencies used in the waveform (e.g., $f_1$, $f_2$, and four intervening frequencies). However, in FIG. 4B, the frequencies are not stepped through in ascending (or descending) order. The steps proceed in a random order such that the waveform is not necessarily continuously increasing (as in FIG. 4A) or decreasing (e.g., an opposite arrangement to FIG. 4A). Using an irregular waveform of this type may be used to optimize the dithering in power transmission device 12. The random order may be repeated in each cycle or may be randomized after each cycle.

A waveform with a stepped shape (in either a regular pattern as in FIG. 4A or an irregular pattern as in FIG. 4B) may include any desired number of steps (e.g., three, four, five, six, seven, eight, more than eight, more than ten, etc.).

To summarize, the modulating signal may have a number of discrete steps. The sequence in which these frequency steps are taken and the duration of each frequency step may be optimized for EMI attenuation or other considerations. The frequency steps may be sequenced in a monotonic, piecewise monotonic or non-monotonic fashion.

In some arrangements, dithering circuitry 84 may use a fixed modulating signal during wireless power transfer operations (i.e., the modulating signal does not change over time). In other arrangements, dithering circuitry 84 may optimize the modulating signal based on real-time conditions. Dithering circuitry 84 may output an optimized modulating signal based on various inputs including one or more of: power receiving device state-of-charge information (e.g., directly reported from the power receiving device using in-band or out-of-band communication, determined based on parameters reported from the power receiving device and/or parameters measured by the power transmitting device, etc.), power receiving device parameters (e.g., a current and/or voltage at coil 48 and/or an output of rectifier 50, etc.), power transmitting device parameters (e.g., a current and/or voltage at coil 36, duty cycle, etc.), properties of the clock waveform (e.g., the frequency and/or shape of clock waveform 88), a maximum frequency jitter constraint, an occupied bandwidth constraint, and a dithering sequence memory constraint.

Returning to FIG. 2, implementations of inverter controller 106 (which may be, for example, a pulse-width modulator) may optionally include scaling of the received clock signal. Herein, scaling of the clock signal refers to taking a high frequency periodic clock signal (e.g., system clock 88 in FIG. 2) and scaling it down to a lower frequency periodic or dithered signal. The inverter controller 106 has as its input a system clock signal ($F_{CLOCK}$). From that clock signal, inverter controller 106 generates a scaled clock signal $F_C$ (e.g., a pulse-width modulated signal) by counting a certain number of clock cycles and then changing its output. For instance, consider the example where no dithering is performed and the system clock signal ($F_{CLOCK}$) received at inverter controller 106 has a frequency of 144 MHz. In this case, the inverter controller may toggle between '0' and '1' every 200 clock counts. This translates into a 360 kHz square-wave (200 clocks for '1'+200 clocks for '0' is 400 clocks per period and 144 MHz/400=360 kHz).

The number of clocks per period (e.g., 400 in the above example) may sometimes be referred to as a scaling factor ($N_{PWM}$). The scaling factor is a positive integer that is used to generate a square wave (that is provided to inverter 61) based on a received clock signal. For a 50% duty cycle, the scaling factor may be divided by two to determine the number of clock cycles between each toggle of the inverter controller output. The example of a 50% duty cycle is merely illustrative, and any desired duty cycle may be used.

As one possible implementation, the modulating signal 90 may be applied to the scaling factor $N_{PWM}$ to implement frequency dithering of the power transmission frequency. For example, the modulating signal is at −6, then −2, then +2, then +6. This signal is applied to a fixed $N_{PWM}$ (400) to achieve the dithered pattern of 394, 398, 402, 406, etc. The representation of the modulating signal as a modification to a fixed scaling factor is merely illustrative. In another possible example, the modulating signal 90 may simply be the sequence for the scaling factor (e.g., 394, 398, 402, 406, etc.) that is applied to the incoming system clock.

Following the example above, inverter controller 106 might first toggle every 197 clock counts, then every 199 clock counts, then every 201 clock counts, then every 203 clock counts, etc. In other words, $N_{PWM}$ is set equal to 394, then 398, then 402, then 406, etc. This would change the PWM waveform frequency from 366.4822 kHz to 361.8090 kHz, to 358.2090 kHz to 354.6798 kHz, etc. Then the pattern may repeat. The amount of time spent at each clock divider ratio (e.g., 197, 199, 201, 203, etc.) could be ½ a power cycle, 1 power cycle, 2 power cycles, 3 power cycles, etc. Using a scaling factor in inverter controller 106 enables easily tunable inverter output.

Next, consider ASK communication receiving circuitry 104 in FIG. 2. ASK communication receiving circuitry 104 may include ASK decoding circuitry 108, down-conversion circuitry 110, analog-to-digital converter 112, and amplifier 114. Amplifier 114 has first and second input terminals connected to opposing sides of capacitor 70. Amplifier 114 therefore outputs the voltage across capacitor 70 to analog-to-digital converter (ADC) 112. ADC 112 converts the voltage from amplifier 114 into a digital signal (s(t)) that is provided to down-conversion circuitry 110. In some notations, s(t) implies an analog signal and s[n] implies a digital signal. While an analog implementation to 52 is possible we will, for ease of presentation but without loss of generality, focus on digital implementations. So, herein, s(t)=s(nT)=s[n], where T is equal to 1 divided by the sampling frequency of ADC 112. Down-conversion circuitry 110 may therefore receive a digital signal that represents the voltage at capacitor 70 over time. It should be noted that down-conversion circuitry may alternatively be included before ADC 112 such that the down-conversion operation is performed in the analog domain. In the subsequent descriptions of the operation of down-conversion circuitry 110, it is assumed for simplicity that there is no phase offset between s(t) (e.g., the signal measured by ASK communication receiving circuitry 104) and the power signal generated by inverter 61. In reality, there is a phase offset that can either be ignored or be handled by tracking phase or doing a I/Q demodulation (see FIG. 10B).

Down-conversion circuitry 110 may process the digital signal from capacitor ADC 112 to remove variations in the signal caused by the clock waveform (and therefore isolate variations caused by ASK communications). Down-conversion circuitry 110 may accomplish this by multiplying the output of ADC 112 by a function of the dithered clock signal using a local oscillator. The local oscillator receives a first input from ADC 112. This first input may be represented by s(t). The input s(t) is equal to the voltage across capacitor 70 over time. The signal s(t) has frequency variations caused by the dithering applied using dithering circuitry 84.

The formula in FIG. 5A shows the approximate value of s(t) where, for simplicity, we are representing the signal as a sinusoid with no phase shift relative to the inverter waveform phase. In the formula of FIG. 5A, A(t) is equal to the amplitude variation induced by amplitude-shift-keying in power receiving device 24, $F_C$ is equal to the scaled clock signal used by inverter controller 106 in FIG. 2 (e.g., $F_c=F_{CLOCK}/N_{PWM}$), and t is equal to time. Δt in FIG. 5A is equal to $2\pi\Delta F_C t$, where $\Delta F_C$ is equal to the modulating signal 90 in FIG. 2.

In other words, s(t) as measured by ADC 112 is a function of both the ASK amplitude variations (A(t)), the scaled clock signal $F_C$, and the modulating signal 90 ($\Delta F_C$). To decode the ASK communication, the signal is ideally processed to be only a function of the ASK amplitude variations (A(t)).

To process the signal s(t), down-conversion circuitry 110 may use a local oscillator to multiply s(t) by a function that includes the modified clock signal 92 (which is equal to $F_C+\Delta F_C$). Specifically, down-conversion circuitry 110 may multiply or mix s(t) by $\cos(2\pi F_C t+\Delta t)$ and then apply a low pass filter (LPF) which allows the baseband signal to pass but rejects the high-frequency portions of the mixer output, as shown in FIG. 5B. In FIG. 5B, r(t) is the filtered version of s(t) that is subsequently provided to ASK decoding circuitry 108 (e.g., the output from down-conversion circuitry 110). The equation of FIG. 5B results in the equation in FIG. 5C. The equation in FIG. 5C may be simplified to obtain the equation in FIG. 5D. As shown by FIG. 5D, down-conversion circuitry 110 ultimately outputs a signal (r(t)) that is only a function of the ASK amplitude variations (A(t)). ASK decoding circuitry 108 may decode the signal (r(t)) from down-conversion circuitry 110 into corresponding bits (e.g., data packets).

In FIG. 2, down-conversion circuitry 110 receives a first input s(t) from ADC 112. The down-conversion circuitry 110 receives a second input from scaling circuitry 116. Scaling circuitry 116 outputs values from a sampled sinusoid (e.g., a sampled cosine (I)) with a frequency of $F_{CLOCK}/N_{SC}$ (where $N_{SC}$ is a scaling factor that is a positive integer). The scaling factor $N_{SC}$ in scaling circuitry 116 may be updated synchronously with the scaling factor $N_{PWM}$ in inverter controller 106 (e.g., $N_{SC}=N_{PWM}$). In this way, blocks 106 and 116 output signals with matching period durations.

As an example, inverter controller 106 may dither at a rate of one frequency step every two power cycles. For instance, inverter controller outputs a square wave at 366.4822 kHz for 2 periods and then switches to the next frequency (361.8090 kHz). In this case, scaling circuitry 116 provides a cosine with two periods at 366.4822 kHz and then switches to the next frequency (361.8090 kHz).

Importantly, it should be noted that down-conversion circuitry 110 uses information regarding the modulating waveform (either in the form of an output from scaling circuitry 116 or other internal logic) in processing the signal s(t) that it receives. Down-converting the dithered signal (s(t)) based on the modulating waveform produces an output signal r(t) without any dithering artifacts. If the down-conversion circuitry has no information regarding the modulating waveform, the local oscillator is not synchronous with the actual power signals provided by inverter 61 (which operates based on the dithered clock signal). If unaccounted for, this dithered inverter output permeates to the signal r(t) provided to ASK decoding circuitry 108, which can lead to bit errors. The exemplary circuit of FIG. 2 allows ASK decoding circuitry (e.g., down-conversion circuitry 110, among others) to see the same dithered clock signal that is used by inverter 61 to create the underlying wireless power transfer signal on which ASK communication is occurring. This information allows down-conversion circuitry to remove signal artifacts introduced by dithering, and to retrieve a more accurate ASK envelope as intended by the ASK circuitry 102 of the data transmitting device.

Figure 10A:
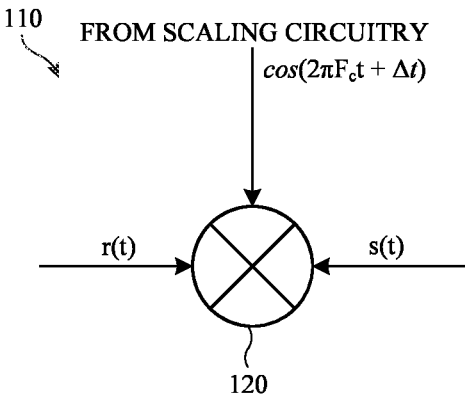
FIGS. 10A and 10B are schematic diagrams of illustrative down-conversion circuitry that may be included in a wireless power system in accordance with an embodiment.

In the descriptions herein, it is assumed for simplicity that there is no phase offset between s(t) (e.g., the signal measured by ASK communication receiving circuitry 104) and the power signal generated by inverter 61. This assumption allows for the equations and analysis above to be represented only with a cosine function (as in FIGS. 5A-5C). A schematic diagram of down-conversion circuitry 110 following this assumption is shown in FIG. 10A. As shown in FIG. 10A, down-conversion circuitry 110 includes a local oscillator 120 that receives a signal from ADC 112 (e.g., s(t)) and a second input (cos(2πF$_C$t+Δt)) from scaling circuitry 116.

Figure 10B:
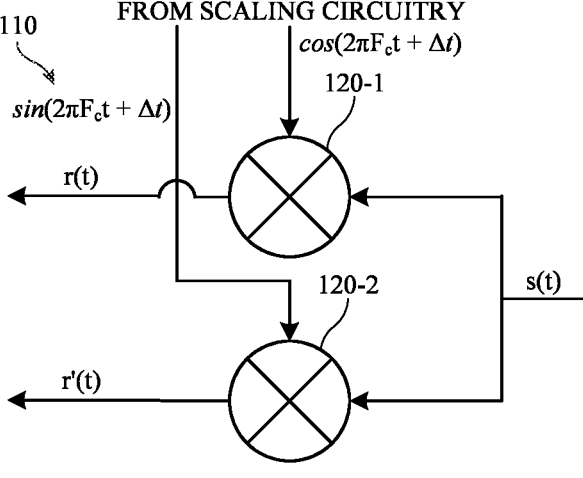

To account for a possible phase offset between s(t) (e.g., the signal measured by ASK communication receiving circuitry 104) and the power signal generated by inverter 61, down-conversion circuitry 110 may include two local oscillators. This type of arrangement is shown in FIG. 10B. As shown in FIG. 10B, down-conversion circuitry 110 includes a first local oscillator 120-1 and a second local oscillator 120-2. The first local oscillator 120-1 receives a signal from ADC 112 (e.g., s(t)) and a second input (cos(2πF$_C$t+Δt)) from scaling circuitry 116. This local oscillator uses a cosine function and represents the in-phase (I) component of the signal. The second local oscillator 120-2 receives a signal from ADC 112 (e.g., s(t)) and a second input (sin((2πF$_C$t+Δt)) from scaling circuitry 116. This local oscillator uses a sine function and represents the quadrature (Q) component of the signal. The outputs from the local oscillators (e.g., r(t) from local oscillator 120-1 and r'(t) from local oscillator 120-2) are provided to ASK decoding circuitry 108 which may use both the oscillator outputs for the ASK decoding.

In the example of FIG. 10B, scaling circuitry 116 may provide values from a sampled cosine (I) and sine (Q) function with a frequency of $F_{CLOCK}/N_{SF}$.

In the subsequent descriptions in connection with FIGS. 6-9, the assumption of no phase offset may be again used for simplicity. However, it is noted that in any one of FIGS. 6-9 the down-conversion circuitry of FIG. 10B may be used to account for phase offset.

In FIG. 2, the clock waveform 88 is dithered by changing the scaling factor used in inverter controller 106 according to a modulating signal. In this embodiment, inverter controller 106 and scaling circuitry 116 both receive clock signal 88 (e.g., an undithered clock signal). Clock signal 88 may therefore sometimes be referred to as a common clock signal for inverter controller 106 and scaling circuitry 116. Alternatively, scaling circuitry 116 may receive a clock signal with a frequency that is at a known multiple or fraction of the frequency of system clock 88 (that is received by inverter controller 106). Dithering circuitry 84 provides modulating signal 90 (e.g., a common modulating signal) to both inverter controller 106 and scaling circuitry 116. This type of arrangement allows for the down-conversion to be synchronized with the dithering of the wireless power signals, which mitigates errors in ASK decoding. However, this example for synchronizing down-conversion with the dithering of the wireless power signals is merely illustrative.

Figure 6:
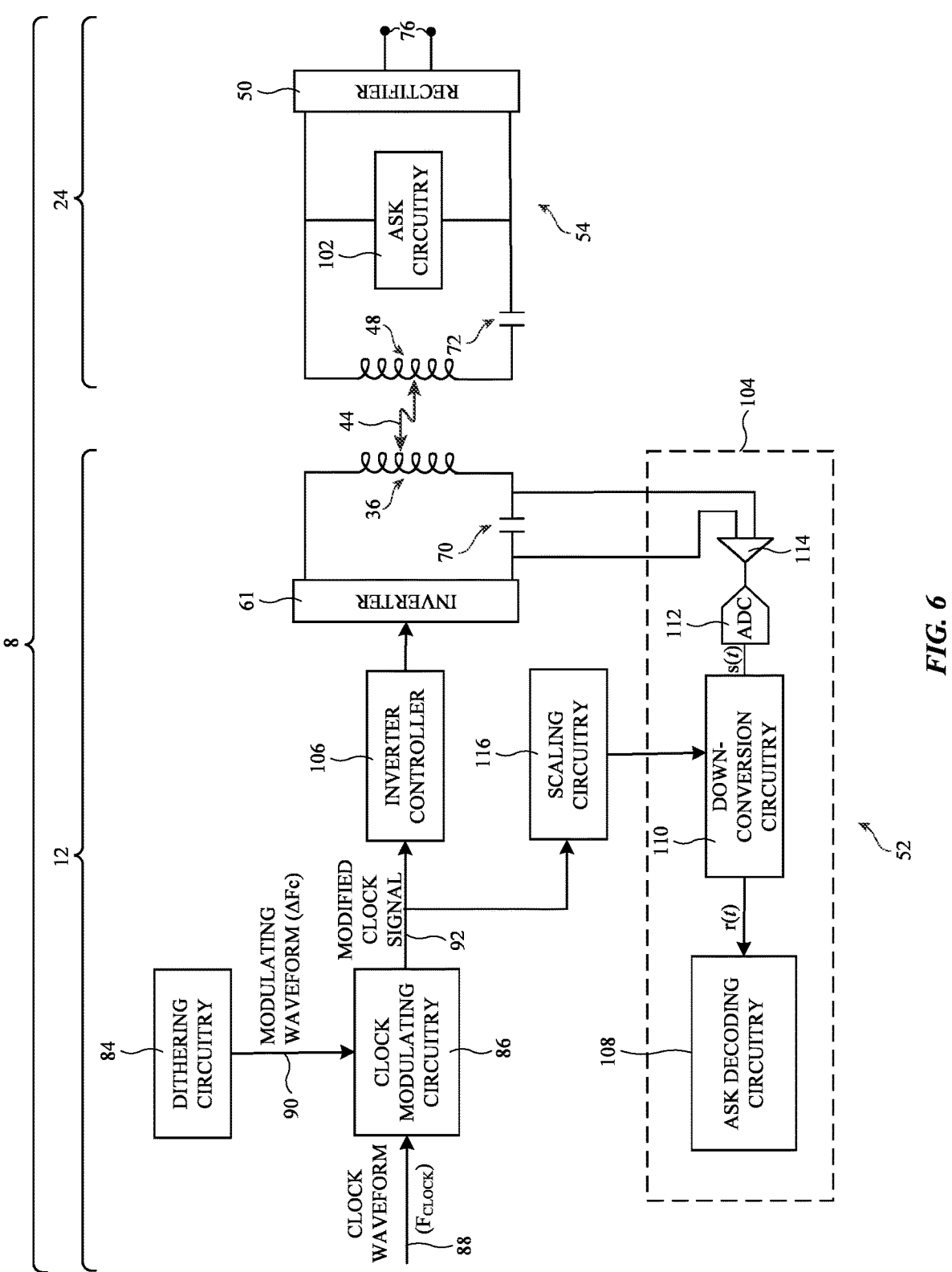
FIG. 6 is a circuit diagram of an illustrative wireless power system with clock modulating circuitry in accordance with various embodiments.

In another possible arrangement, shown in FIG. 6, clock modulating circuitry 86 is included to directly dither clock waveform 88 using the modulating signal 90 from dithering circuitry 84. Clock modulating circuitry 86 outputs a modified (dithered) clock signal 92 that is subsequently provided to both inverter controller 106 and scaling circuitry 116.

As shown in FIG. 6, power transmitting device 12 may include dithering circuitry 84 and clock modulating circuitry 86 that is used to perform frequency dithering during wireless power transfer operations. Dithering circuitry 84 and clock modulating circuitry 86 may be considered part of power transmission frequency 52 and/or control circuitry 16 in device 12. To improve wireless power transfer waveform characteristics (such as reduced harmonic emissions) in system 8, modulating signal 90 is applied to clock waveform 88 by clock modulating circuitry 86. Clock modulating circuitry 86 may use modulating signal 90 to frequency modulate clock waveform 88. The corresponding modified clock signal 92 is then provided to inverter controller 106, which uses the modified clock signal to provide control signals to inverter 61. Inverter 61 creates AC current signals for wireless power transmission based on the control signals from inverter controller 106. The same clock signal (e.g., modified clock signal 92) is also provided to scaling circuitry 116 such that ASK communication receiving circuitry 104 removes the dithering pattern from the received ASK signal.

In FIG. 6, the scaling factor used in both inverter controller 106 and scaling circuitry 116 may be fixed. The same scaling factor may be used in both inverter controller 106 and scaling circuitry 116 (e.g., $N_{SC}=N_{PWM}$).

Figure 7:
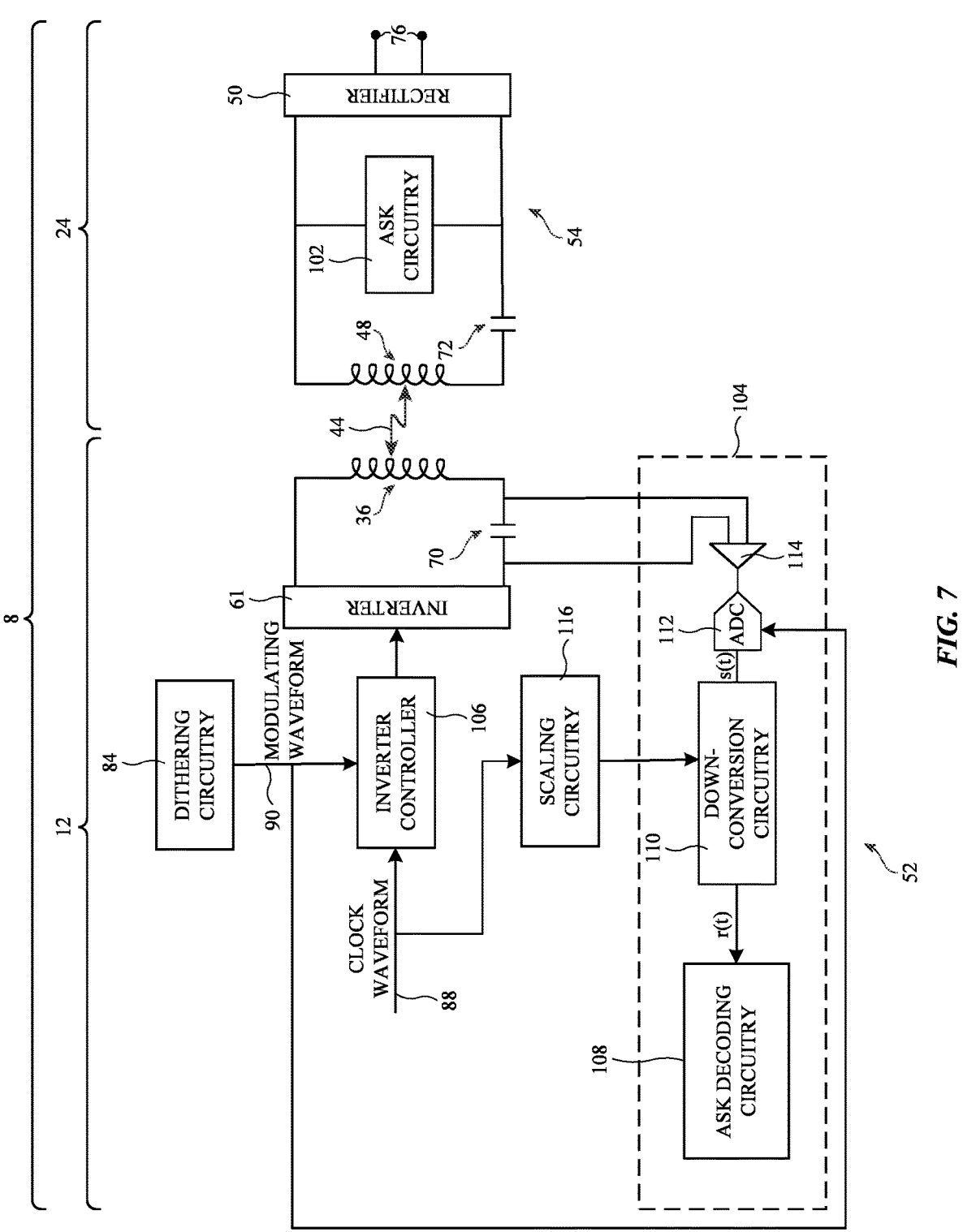
FIG. 7 is a circuit diagram of an illustrative wireless power system with dithering circuitry that provides a modulating signal to an ADC in accordance with an embodiment.

In another possible arrangement, shown in FIG. 7, dithering circuitry 84 again provides the modulating signal 90 directly to inverter controller 106 (similar to as in FIG. 2). To synchronize the down-conversion with the dithering of the wireless power signals, the modulating signal from dithering circuitry 84 is also provided to ADC 112. ADC 112 has a sampling rate. In FIGS. 2 and 6, the sampling rate for ADC 112 is fixed. In FIG. 7, however, the modulating signal 90 from dithering circuitry 84 may be applied to the ADC sampling rate. This effectively synchronizes the down-conversion performed by circuitry 110 with the dithering of the wireless power signals.

In FIG. 7, scaling circuitry 116 and inverter controller 106 receive (and scale) a common undithered clock waveform 88. Scaling circuitry 116 may use a fixed scaling factor to scale the undithered clock waveform. The output from scaling circuitry 116 to down-conversion circuitry 110 is therefore unaffected by dithering. However, s(t) generated by ADC 112 is synchronized with the dithering of the wireless power signals by modulating the ADC sampling rate with the modulating signal 90. Consequently, the down-conversion circuitry 110 produces an output signal r(t) without any dithering artifacts.

Figure 8:
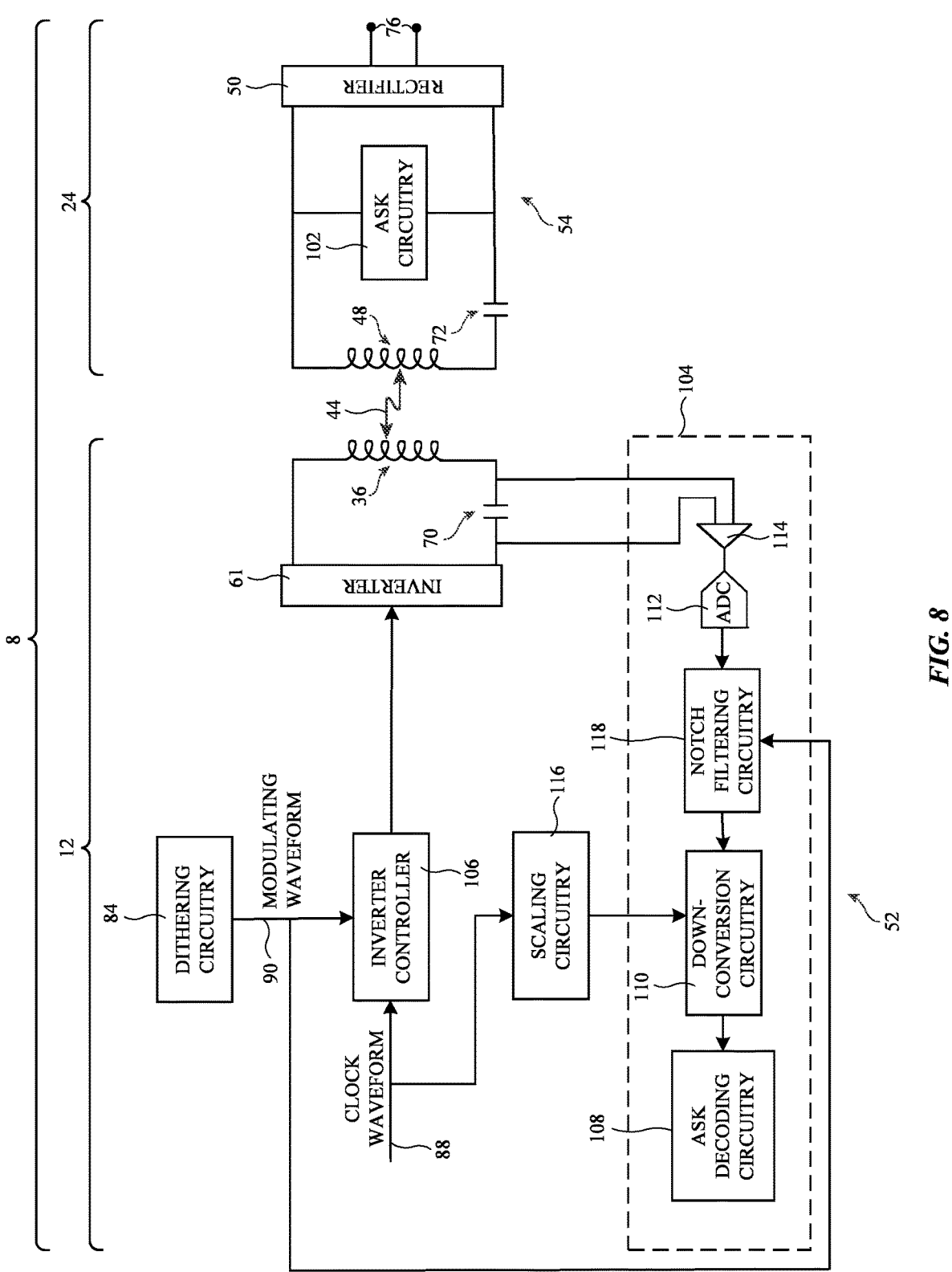
FIG. 8 is a circuit diagram of an illustrative wireless power system with dithering circuitry that provides a modulating signal to notch filtering circuitry in accordance with an embodiment.

In another possible arrangement, shown in FIG. 8, notch filtering circuitry 118 may be included in ASK communication receiving circuitry 104. The notch filtering circuitry may be interposed between down-conversion circuitry 110 and ADC 112. The notch filtering circuitry may apply a notch filter to the output from ADC 112 to remove portions of the signal within given frequency bands. The removed frequency bands may be determined in advanced knowing the dither rate (and the associated sidebands of the carrier frequency) or at run-time based on the modulating signal 90 from dithering circuitry 84. A given modulating signal 90 from dithering circuitry 84 may have associated frequency bands that are likely to cause bit errors during decoding (if not removed). Removing these portions of the signal before down-conversion (by circuitry 110) therefore mitigates bit errors in ASK decoding circuitry 108.

In FIG. 8, notch filtering circuitry 118 is included between down-conversion circuitry 110 and coil 36. In other words, the notch filtering operations are performed before down-conversion. When the notch filtering circuitry is included before the down-conversion circuitry, the notch filtering circuitry may be included after ADC 112 (as in FIG. 8) or before ADC 112 (and operate in the analog domain). Additionally, the notch filtering circuitry 118 may alternately be interposed between down-conversion circuitry 110 and ASK decoding circuitry 108. In other words, the notch filtering operations may be performed after down-conversion if desired.

Examples of notch filtering circuitry 118 include an infinite impulse response (IIR) filter or a finite impulse response (FIR) filter. In the case of the finite impulse response (FIR) filter, the signal (from ADC 112) may be averaged over a period of time that is equal to an integer multiple of the dither period (where dither period is equal to $1/f_m$).

FIG. 9 is a flowchart of illustrative operations for operating a power transmitting device that performs frequency dithering of a clock signal. As shown, at step 202, a modulating signal may be used to perform frequency dithering of the clock signal that is used by inverter controller 106 to control inverter 61. Dithering circuitry 84 may generate the modulating signal. In some cases (e.g., as shown in FIG. 6) the modulating signal may be applied directly to an undithered clock waveform before being provided to inverter controller 106 and inverter controller 106 supplies control signals to the inverter 61 based on the received dithered clock signal. In other cases, inverter controller 106 may separately receive an undithered clock signal and the modulating signal. Inverter controller 106 may dither the undithered clock signal using the modulating signal by applying the modulating signal to a scaling factor that is applied to the clock signal in inverter controller 106 (e.g., as shown in FIGS. 2, 7, and 8). Regardless of the dithering technique used, inverter controller 106 may supply control signals to the inverter based on a clock signal that is dithered using the modulating signal from dithering circuitry 84.

At step 204, the modulating signal may be provided to ASK communication receiving circuitry 104. There are several possibilities (e.g., direct and indirect) for how the modulating signal is provided to ASK communication receiving circuitry 104. In FIG. 6, the modified clock signal 92 (which is a function of the modulating signal 90) is scaled and provided to ASK communication receiving circuitry 104 (specifically down-conversion circuitry 110). In FIG. 2, modulating signal 90 is provided to scaling circuitry 116. Scaling circuitry 116 provides a dithered clock signal (that is a function of the modulating signal) to ASK communication receiving circuitry 104 (specifically down-conversion circuitry 110). In FIG. 7, the modulating signal is provided to ADC 112 in ASK communication receiving circuitry 104. In FIG. 8, the modulating signal is provided to notch filtering circuitry 118 in ASK communication receiving circuitry 104.

Said another way, ASK communication receiving circuitry 104 receives modulating signal information at step 204. The modulating signal information may be the modulating signal itself (as in FIGS. 7 and 8) or a signal that is modulated using the modulating signal (as in FIGS. 2 and 6).

Said yet another way, ASK communication receiving circuitry 104 receives frequency dithering information at step 204. The frequency dithering information may be the modulating signal itself (as in FIGS. 7 and 8) or a signal that is frequency dithered using the modulating signal (as in FIGS. 2 and 6).

Finally, at step 206, the ASK communication receiving circuitry is used to decode wireless power signals into corresponding bits. The wireless power signals are measured using amplifier 114 and ADC 112, down-converted and filtered using circuitry 110, and then decoded using ASK decoding circuitry 108. Notch filtering may optionally be applied before or after down-conversion as shown and discussed in connection with FIG. 8.

Each one of dithering circuitry 84, inverter controller 106, clock modulating circuitry 86, scaling circuitry 116, down-conversion circuitry 110, ASK decoding circuitry 108, and notch filtering circuitry 118 may include one or more associated microprocessors, power management units, baseband processors, digital signal processors, microcontrollers, and/or application-specific integrated circuits. Each one of dithering circuitry 84, inverter controller 106, clock modulating circuitry 86, scaling circuitry 116, down-conversion circuitry 110, ASK decoding circuitry 108, and notch filtering circuitry 118 may be considered part of control circuitry 16 and/or wireless power transmitting circuitry 52.

The aforementioned example of a wireless power transmitting device receiving ASK communications from a wireless power receiving device is merely illustrative. In another possible arrangement, a wireless power receiving device may receive ASK communications from a wireless power transmitting device. In this type of arrangement, the wireless power receiving device may include ASK communication receiving circuitry 104 of any of the embodiments described herein. The ASK communication receiving circuitry may use information regarding a modulating signal (that is used to dither the wireless power signals) during ASK demodulation. For example, the ASK communication receiving circuitry in the wireless power receiving device may receive information regarding the modulating signal at down-conversion circuitry, notch filtering circuitry, or an analog-to-digital converter.

The foregoing is merely illustrative and various modifications can be made to the described embodiments. The foregoing embodiments may be implemented individually or in any combination.

What is claimed is:

1. A wireless power transmitting device configured to provide wireless power to a wireless power receiving device, comprising:
  a wireless power transmitting coil;
  an inverter that is configured to supply alternating-current drive signals to the wireless power transmitting coil;
  an inverter controller that is configured to, based on a clock signal that is dithered using a modulating signal, supply control signals to the inverter; and
  amplitude-shift-keying communication receiving circuitry configured to, based at least partially on information regarding the modulating signal, monitor alternating-current signals at the wireless power transmitting coil and decode the monitored alternating-current signals into bits.

2. The wireless power transmitting device of claim 1, wherein the amplitude-shift-keying communication receiving circuitry comprises down-conversion circuitry and amplitude-shift-keying decoding circuitry that receives an output from the down-conversion circuitry and wherein the wireless power transmitting device further comprises:
  scaling circuitry, wherein the inverter controller and the scaling circuitry both receive a system clock signal and the modulating signal, wherein the inverter controller is configured to supply control signals to the inverter based on the system clock signal and the modulating signal, and wherein the scaling circuitry is configured to output a modified clock signal to the down-conversion circuitry based on the system clock signal and the modulating signal.

3. The wireless power transmitting device of claim 1, wherein the amplitude-shift-keying communication receiving circuitry comprises down-conversion circuitry and amplitude-shift-keying decoding circuitry that receives an output from the down-conversion circuitry and wherein the wireless power transmitting device further comprises:
  scaling circuitry; and
  clock modulating circuitry configured to:
    receive a system clock signal and the modulating signal;
    modulate the system clock signal using the modulating signal to create a modified clock signal; and
    provide the modified clock signal to the inverter controller and to the scaling circuitry, wherein the scaling circuitry is configured to receive the modified clock signal from the clock modulating circuitry and output a scaled version of the modified clock signal to the down-conversion circuitry.

4. The wireless power transmitting device of claim 1, further comprising a capacitor connected in series with the wireless power transmitting coil, wherein the amplitude-shift-keying communication receiving circuitry comprises:
  an amplifier with first and second inputs connected to first and second opposing sides of the capacitor;
  an analog-to-digital converter that receives an output from the amplifier, wherein the analog-to-digital converter has a sampling rate that is dithered according to the modulating signal;
  down-conversion circuitry that receives an output from the analog-to-digital converter; and
  amplitude-shift-keying decoding circuitry that receives an output from the down-conversion circuitry.

5. The wireless power transmitting device of claim 1, wherein the amplitude-shift-keying communication receiving circuitry comprises:
  notch filtering circuitry that filters the monitored alternating-current signals, wherein the notch filtering circuitry receives the information regarding the modulating signal and removes frequency components of the modulating signal;
  down-conversion circuitry that receives an output from the notch filtering circuitry; and
  amplitude-shift-keying decoding circuitry that receives an output from the down-conversion circuitry.

6. The wireless power transmitting device of claim 1, wherein the inverter controller is a pulse-width modulator and wherein the amplitude-shift-keying communication receiving circuitry comprises:
  down-conversion circuitry that down-converts the monitored alternating-current signals;
  notch filtering circuitry that receives an output from the down-conversion circuitry, wherein the notch filtering circuitry receives the information regarding the modulating signal and removes frequency components of the modulating signal; and
  amplitude-shift-keying decoding circuitry that receives an output from the notch filtering circuitry.

7. The wireless power transmitting device of claim 1, wherein the modulating signal comprises a repeating pattern of frequency steps.

8. The wireless power transmitting device of claim 1, wherein the modulating signal comprises a repeating pattern of more than eight frequency steps.

9. A non-transitory computer-readable storage medium storing one or more programs configured to be executed by one or more processors of a wireless power transmitting device that is configured to provide wireless power to a wireless power receiving device, wherein the wireless power transmitting device comprises a wireless power transmitting coil, an inverter that is configured to supply alternating-current drive signals to the wireless power transmitting coil, and an inverter controller that is configured to, based on a clock signal that is dithered using a modulating signal, supply control signals to the inverter, the one or more programs including instructions for:
  based at least partially on information regarding the modulating signal, monitor alternating-current signals at the wireless power transmitting coil and decode the monitored alternating-current signals into bits.

10. The non-transitory computer-readable storage medium of claim 9, wherein the wireless power transmitting device further comprises down-conversion circuitry, amplitude-shift-keying decoding circuitry that receives an output from the down-conversion circuitry, and scaling circuitry, wherein the inverter controller and the scaling circuitry both receive a system clock signal and the modulating signal, wherein the inverter controller is configured to supply control signals to the inverter based on the system clock signal and the modulating signal, and wherein the scaling circuitry is configured to output a modified clock signal to the down-conversion circuitry based on the system clock signal and the modulating signal.

11. The non-transitory computer-readable storage medium of claim 9, wherein the wireless power transmitting device further comprises down-conversion circuitry, amplitude-shift-keying decoding circuitry that receives an output from the down-conversion circuitry, scaling circuitry, and clock modulating circuitry configured to:

receive a system clock signal and the modulating signal;

modulate the system clock signal using the modulating signal to create a modified clock signal; and provide the modified clock signal to the inverter controller and to the scaling circuitry, wherein the scaling circuitry is configured to receive the modified clock signal from the clock modulating circuitry and output a scaled version of the modified clock signal to the down-conversion circuitry.

12. The non-transitory computer-readable storage medium of claim 9, wherein the wireless power transmitting device further comprise:

a capacitor connected in series with the wireless power transmitting coil;

an amplifier with first and second inputs connected to first and second opposing sides of the capacitor;

an analog-to-digital converter that receives an output from the amplifier, wherein the analog-to-digital converter has a sampling rate that is dithered according to the modulating signal;

down-conversion circuitry that receives an output from the analog-to-digital converter; and amplitude-shift-keying decoding circuitry that receives an output from the down-conversion circuitry.

13. The non-transitory computer-readable storage medium of claim 9, wherein the wireless power transmitting device further comprises:

notch filtering circuitry that filters the monitored alternating-current signals, wherein the notch filtering circuitry receives the information regarding the modulating signal and removes frequency components of the modulating signal;

down-conversion circuitry that receives an output from the notch filtering circuitry; and amplitude-shift-keying decoding circuitry that receives an output from the down-conversion circuitry.

14. The non-transitory computer-readable storage medium of claim 9, wherein the inverter controller is a pulse-width modulator and wherein the wireless power transmitting device further comprises:

down-conversion circuitry that down-converts the monitored alternating-current signals;

notch filtering circuitry that receives an output from the down-conversion circuitry, wherein the notch filtering circuitry receives the information regarding the modulating signal and removes frequency components of the modulating signal; and amplitude-shift-keying decoding circuitry that receives an output from the notch filtering circuitry.

15. A method of operating a wireless power transmitting device that is configured to provide wireless power to a wireless power receiving device, wherein the wireless power transmitting device comprises a wireless power transmitting coil, an inverter, an inverter controller, and amplitude-shift-keying communication receiving circuitry, the method comprising:

using the inverter, supplying alternating-current drive signals to the wireless power transmitting coil;

using the inverter controller, supplying control signals to the inverter based on a clock signal that is dithered using a modulating signal; and using the amplitude-shift-keying communication receiving circuitry, based at least partially on information regarding the modulating signal, monitoring alternating-current signals at the wireless power transmitting coil and decoding the monitored alternating-current signals into bits.

16. The method of claim 15, wherein the wireless power transmitting device further comprises scaling circuitry, wherein the amplitude-shift-keying communication receiving circuitry comprises down-conversion circuitry and amplitude-shift-keying decoding circuitry, and wherein the method further comprises:

using the amplitude-shift-keying decoding circuit, receiving an output from the down-conversion circuitry;

receiving a system clock signal and the modulating signal with both the inverter controller and the scaling circuitry, using the inverter controller, supplying control signals to the inverter based on the system clock signal and the modulating signal; and using the scaling circuitry, outputting a modified clock signal to the down-conversion circuitry based on the system clock signal and the modulating signal.

17. The method of claim 15, wherein the amplitude-shift-keying communication receiving circuitry comprises down-conversion circuitry and amplitude-shift-keying decoding circuitry that receives an output from the down-conversion circuitry, wherein the wireless power transmitting device further comprises scaling circuitry and clock modulating circuitry, and wherein the method further comprises, using the clock modulating circuitry:

receiving a system clock signal and the modulating signal;

modulating the system clock signal using the modulating signal to create a modified clock signal; and providing the modified clock signal to the inverter controller and to the scaling circuitry, wherein the scaling circuitry is configured to receive the modified clock signal from the clock modulating circuitry and output a scaled version of the modified clock signal to the down-conversion circuitry.

18. The method of claim 15, wherein the wireless power transmitting device further comprises a capacitor connected in series with the wireless power transmitting coil and wherein the amplitude-shift-keying communication receiving circuitry comprises:

an amplifier with first and second inputs connected to first and second opposing sides of the capacitor;

an analog-to-digital converter that receives an output from the amplifier, wherein the analog-to-digital converter has a sampling rate that is dithered according to the modulating signal;

down-conversion circuitry that receives an output from the analog-to-digital converter; and amplitude-shift-keying decoding circuitry that receives an output from the down-conversion circuitry.

19. The method of claim 15, wherein the amplitude-shift-keying communication receiving circuitry comprises:

notch filtering circuitry that filters the monitored alternating-current signals, wherein the notch filtering circuitry receives the information regarding the modulating signal and removes frequency components of the modulating signal;

down-conversion circuitry that receives an output from the notch filtering circuitry; and amplitude-shift-keying decoding circuitry that receives an output from the down-conversion circuitry.

20. The method of claim 15, wherein the amplitude-shift-keying communication receiving circuitry comprises:

down-conversion circuitry that down-converts the monitored alternating-current signals;

notch filtering circuitry that receives an output from the down-conversion circuitry, wherein the notch filtering circuitry receives the information regarding the modulating signal and removes frequency components of the modulating signal; and amplitude-shift-keying decoding circuitry that receives an output from the notch filtering circuitry.

\*  \*  \*  \*  \*